United States Patent
Huang et al.

(10) Patent No.: US 9,865,104 B1
(45) Date of Patent: Jan. 9, 2018

(54) GESTURE ENCRYPTED ACCESS SYSTEM BASED ON MULTIDIMENSIONAL CODE

(71) Applicant: Honeywell International Inc., Morris Plains, NJ (US)

(72) Inventors: Ying Huang, Shanghai (CN); Zhaocheng Sheng, Shanghai (CN); Chen Chen, Shanghai (CN)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/238,204

(22) Filed: Aug. 16, 2016

(51) Int. Cl.
| | |
|---|---|
| *G06K 7/10* | (2006.01) |
| *G07C 9/00* | (2006.01) |
| *G06K 7/14* | (2006.01) |
| *G06F 21/32* | (2013.01) |
| *G06F 21/60* | (2013.01) |

(52) U.S. Cl.
CPC ......... *G07C 9/00071* (2013.01); *G06F 21/32* (2013.01); *G06F 21/602* (2013.01); *G06K 7/1417* (2013.01)

(58) Field of Classification Search
USPC ................. 235/382, 440, 380, 492
See application file for complete search history.

(56) References Cited

U.S. PATENT DOCUMENTS

| | | | |
|---|---|---|---|
| 6,119,874 A * | 9/2000 | Anderson | A47F 5/0823 211/57.1 |
| 6,345,104 B1 | 2/2002 | Rhoads | |
| 6,522,771 B2 | 2/2003 | Rhoads | |
| 6,750,985 B2 | 6/2004 | Rhoads | |
| 7,130,087 B2 | 10/2006 | Rhoads | |
| 9,100,393 B2 | 8/2015 | Schell et al. | |
| 2001/0022848 A1 | 9/2001 | Rhoads | |
| 2001/0031065 A1 | 10/2001 | Rhoads | |
| 2002/0080995 A1 | 6/2002 | Rhoads | |
| 2002/0080996 A1 | 6/2002 | Rhoads | |
| 2005/0018874 A1 | 1/2005 | Rhoads | |
| 2006/0059365 A1* | 3/2006 | Harper | G06F 19/323 713/186 |
| 2007/0182818 A1* | 8/2007 | Buehler | G08B 13/19602 348/143 |
| 2009/0089497 A1 | 4/2009 | Bulygin et al. | |
| 2010/0246902 A1* | 9/2010 | Rowe | G06K 9/00033 382/115 |
| 2011/0309146 A1* | 12/2011 | Zazzu | G06K 19/16 235/440 |
| 2012/0117635 A1 | 5/2012 | Schell et al. | |
| 2013/0008958 A1* | 1/2013 | Smith | G07C 9/00904 235/382 |
| 2013/0141587 A1* | 6/2013 | Petricoin, Jr. | G07C 9/00111 348/156 |

(Continued)

*Primary Examiner* — Allyson Trail
(74) *Attorney, Agent, or Firm* — Seager, Tufte & Wickhem, LLP

(57) ABSTRACT

A system and approach utilizing a multi-dimensional code on a card and a gesture applied to the card for a scan. The two-dimensional card may contain information about the card holder, other individuals, the facility or area at which access is desired, and a gesture relating to scanning the card. Appropriate information and a correct gesture applied to the card during a scan may enable a holder of the card to gain access to the facility or area. The gesture may legitimize the card holder.

20 Claims, 3 Drawing Sheets

(56) References Cited

U.S. PATENT DOCUMENTS

| | | | |
|---|---|---|---|
| 2013/0160088 A1* | 6/2013 | McFarland | H04W 12/08 |
| | | | 726/4 |
| 2013/0181050 A1* | 7/2013 | McConnell | G06K 7/0004 |
| | | | 235/440 |
| 2014/0183258 A1* | 7/2014 | DiMuro | G06Q 20/40145 |
| | | | 235/380 |
| 2014/0296089 A1* | 10/2014 | Holmes | G01N 35/026 |
| | | | 506/9 |
| 2014/0373132 A1* | 12/2014 | Basmov | G06F 21/31 |
| | | | 726/19 |
| 2015/0091841 A1* | 4/2015 | Lewis | G06F 3/044 |
| | | | 345/174 |
| 2015/0193115 A1* | 7/2015 | Chirakan | G06F 3/0488 |
| | | | 715/810 |
| 2015/0228133 A1* | 8/2015 | Capaldi-Tallon | G07C 9/00039 |
| | | | 340/5.54 |
| 2015/0302289 A1* | 10/2015 | Suwald | G06F 1/16 |
| | | | 235/492 |
| 2016/0044493 A1 | 2/2016 | Schell et al. | |
| 2016/0171361 A1* | 6/2016 | Chatterton | G06F 21/77 |
| | | | 705/41 |
| 2017/0098065 A1* | 4/2017 | Vaughn | G06F 21/316 |
| 2017/0103266 A1* | 4/2017 | Migdal | G06K 9/00771 |

\* cited by examiner

GESTURE ENCRYPTED ACCESS SYSTEM BASED ON MULTIDIMENSIONAL CODE

BACKGROUND

The present disclosure pertains to access systems and to access systems using cards that are scanned for access to a facility or area.

SUMMARY

The disclosure reveals a system and approach utilizing a multi-dimensional code on a card and a gesture applied to the card for a scan. The two-dimensional card may contain information about the card holder, other individuals, the facility or area at which access is desired, and a gesture relating to scanning the card. Appropriate information and a correct gesture applied to the card during a scan may enable a holder of the card to gain access to the facility or area. The gesture may legitimize the card holder.

DESCRIPTION

Figure 1:
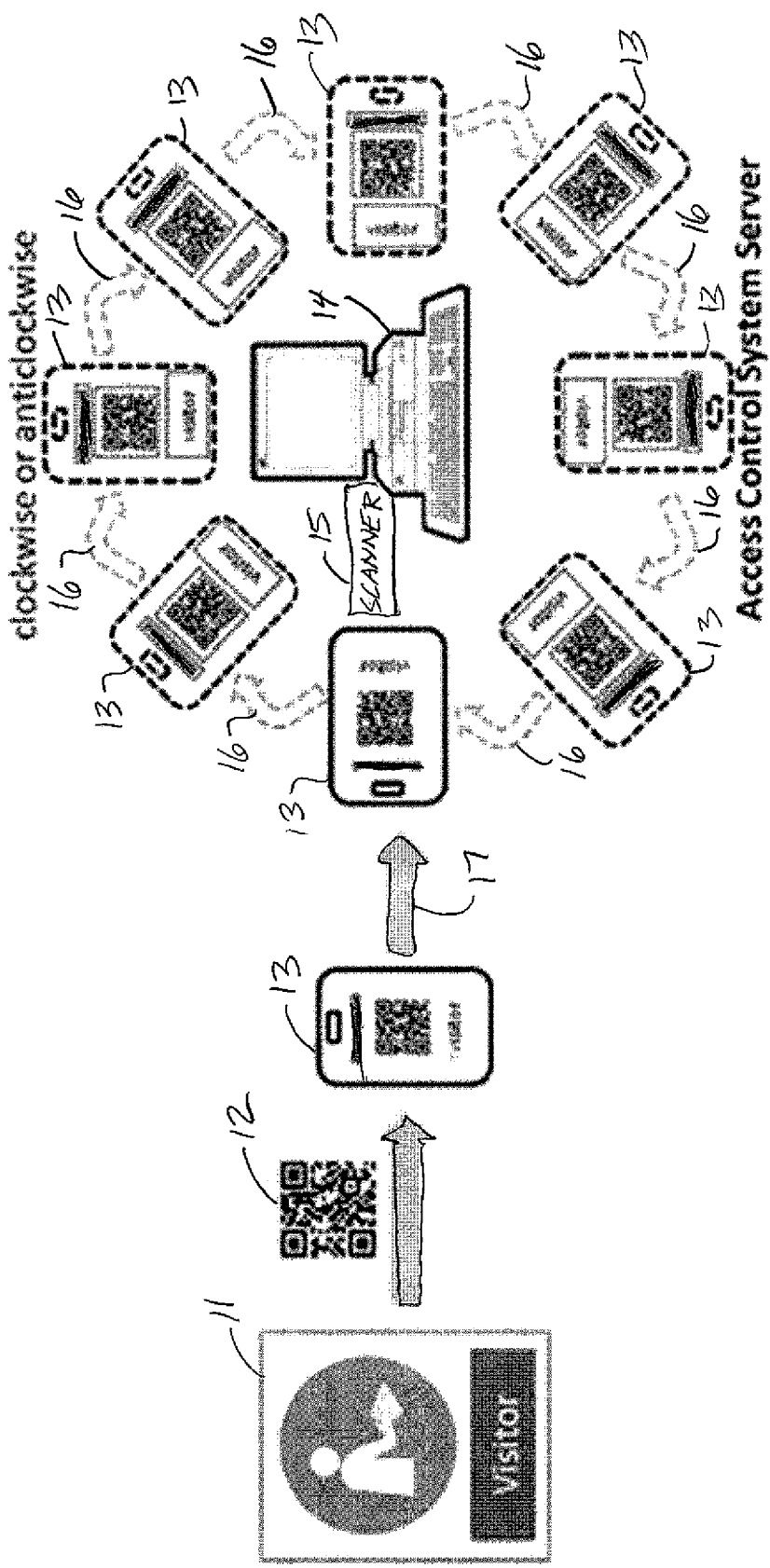
FIG. 1 is diagram of a gesture access system utilizing a two-dimensional code.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A two-dimensional (e.g., two dimension) code may be used in an access control system. A two-dimensional code scanner may decode information that is hidden in the two-dimensional code, and approve or reject the application which had been presupposed. But the scanner might not be able to identify whether the card holder is authorized or legal, in that the scanner might only decode the two-dimensional coded message.

In an access control system application, the scanner may identify not only the message on the card, but also the legality of a card holder. So it may be necessary to add other elements to achieve a goal in the access control system. The present system may provide an easy and economical access control system that scans a two-dimensional code, adds direction, identification, tracks the scanning process, and sets up a maximum retry scanning time in order to enhance the security level. Other features may be added.

When building a two-dimensional code card for a holder, the message on the two-dimensional code card may include information about the card holder, a scanning track (clockwise/anticlockwise rotation), the beginning direction of card (before and at a scan), direction during the scan, and an ending direction of the card (at and after the scan).

With the different card begin-directions, such as during scan directions, the card end-directions, and scan tracks; the card may provide enough combinations for the rotate and direction operations during the scanning process, for many unique identifications of the various cards. Thus, the system may easily void a card identification that may be used by a wrong holder.

In a use scenario, a visitor may get the two-dimensional code which is printed on materials such as paper, and be shown how to operate the scanner at the entry or reception area. Once the visitor intends to enter the secured area, the scanner of the access system may scan the two-dimensional code to check card holder's information, the scan track (rotation) and the card direction. The access application may be approved after all the information pieces are matched with the information pieces presupposed in the access system. Otherwise, the application may be rejected. Also, if the card holder tries more than the preset maximum number of times, the control system may send an alarm to the administrator.

The rotation may mean the rotating the physical or electronic orientation of the card when being scanned or encrypted. When one scans the card having a two-dimensional code, scanner may originally get the information from the two-dimensional code. Further, a physical rotation of a card may also be an encrypted signal based on the two-dimensional code, such as a ninety degree clockwise rotation.

The term "gesture" may refer to a positioning of the card for encryption or scanning. Actually, the gesture may be more a "physical rotation" rather than an "electronic rotation". While scanning the card, a user may rotate the card physically a certain angle, like ninety (90) degrees clockwise. Also, the card may be just be scanned but will not necessarily be encrypted. The information flow may be just from card to scanner. The scanner might do nothing to the card. Encryption may be an action from a scanner to the card. A new two-dimensional card may be developed with encryption.

A guest, for instance, Leo, may come to a reception desk at a facility and provide his basic information, like his name, whom to visit and zone to visit, for example, zone A. The reception desk may print one card with a two-dimensional code and let Leo know a rotation angle while using the card. The rotation may be a gesture. Leo may want to access zone "A" and thus will show the card in front of the scanner. Meanwhile, Leo may rotate the card with the gesture and be admitted to zone "A". Leo cannot access zone "B" using this card and gesture. If Leo drops this card and George picks up, George cannot access zone "A" even though he has this card because George does not know the gesture.

An implementation of the present approach may use a QR code but it is not necessarily limited to the QR code. QR code may be just one kind of a two-dimensional code. Reasons for using a two-dimensional code in the present approach is that the two-dimensional code may contain information about guests, besides the card holder, such as a name, addresses, zones to visit, and so forth. The two-dimensional code may need a scanner to decode the information. The scanner may recognize, for example, a rotation angle, direction and other characteristics, which are features of the present system.

FIG. 1 is diagram of a gesture access system utilizing a two-dimensional code. A visitor 11 may have a two-dimensional code 12 on an access card 13. Access card 13 with code 12 information may be entered with a scan at an access control system server 14. Card 13 may be gesture encrypted in that the card may be rotated clockwise or counterclockwise while swiping card 13 across a scanner 15. Scanner 15 and server 14 may require a correct two-dimensional code 12 and a proper gesture 16 with a scan track and an appropriate direction 17 of card 13 during the swipe for a scan to achieve a grant of access or other grant, permission or approval.

Figure 2:
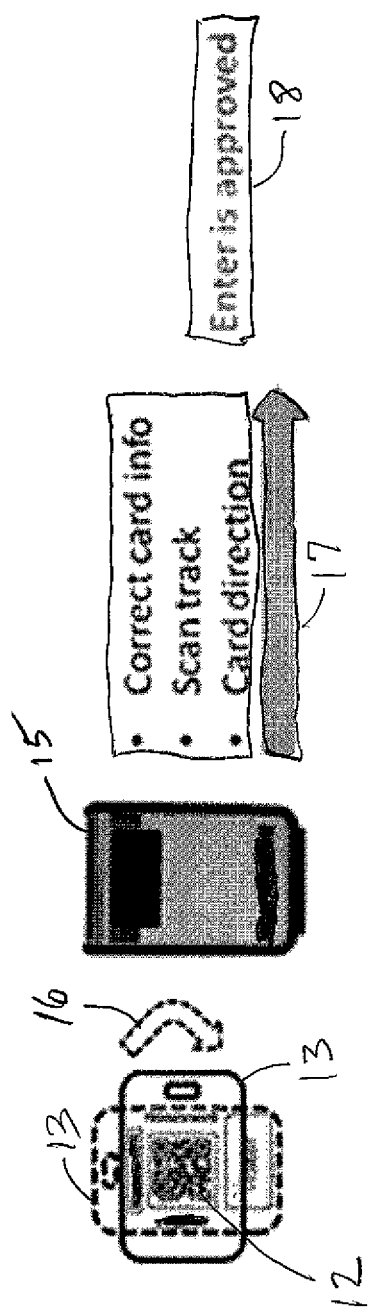
FIG. 2 is a diagram of a gesture of an example card for a scan.

FIG. 2 is a diagram that may reveal gesture 16 of a ninety degree clockwise rotation of an example card 13 and its associated two-dimensional code 12. Card 13 may be swiped in a particular direction 17 relative to scanner 15 as a part of gesture 16. Scanner may detect whether information from code 12 is correct, and whether the scan track or gesture 16 including card direction 17 correspond appropriately with one another so as to result in a grant or permission for such things as an approved entry.

Figure 3:
FIG. 3 is a diagram of examples of two-dimensional codes.

FIG. 3 is a diagram of examples of two-dimensional codes having different sizes in terms of a number of characters. Code 21 may be a HanXin (ECC Level 2) shown in sizes of 30, 70 and 100 characters. Code 22 may be a QR (quick response) code (ECC M) shown in sizes of 30, 70 and 100 characters. Code 23 may be an Aztec code shown in sizes of 30, 70 and 100 characters. Codes 21, 22 and 23 may have other sizes in terms of numbers of characters for information. Also, other kinds of codes of various sizes may be used in the present system.

To recap, an access control mechanism may incorporate an item having a multidimensional pattern, and an optical scanner that decodes the multidimensional pattern. An entry or exit of s facility or an area may be sought for a holder of the item. The optical scanner upon a scan of the item may decode the multidimensional pattern on the item which has a gesture applied to the item, into a result. If the result from the scanner and the gesture applied to the card meet predetermined criteria, then the entry or exit of the facility or area may be granted to the holder of the item.

The gesture may be applied to the item before, during or after the scan.

The gesture may be one or more actions selected from a group incorporating a track of clockwise rotation, a track of counterclockwise rotation, a direction of the item at a beginning of the scan, a direction of the item during the scan, and a direction of the item at an ending of the scan.

The item may be a card or a badge.

The multidimensional pattern may be a two-dimensional pattern.

The result may contain information or data about the holder of the item.

The result may incorporate information about the gesture and the result may be reviewed by the scanner to determine whether the conditions for the gesture are met during the scan.

A number of attempted determinations to have the conditions for the gesture be met during a scan may be limited to Y. Y may be a predetermined number.

An approach for controlling access may incorporate writing information on a card in a two-dimensional code, and scanning the card to read the information from the two-dimensional code on the card. The information may incorporate data about a card holder and a description of a gesture needed for scanning the card.

A gesture may incorporate one or more items selected from a group having a direction of the card at a beginning portion of a scan, a direction of the card during the scan, a direction of the card at an ending portion of the scan, a scanning track of clockwise rotation, and a scanning track of counter-clockwise rotation.

The two-dimensional code may be selected from a group incorporating HanXin codes, quick response (QR) codes and Aztec codes.

If the card is accepted upon its scan by a scanner, then the card holder may gain access to an entity controlled by the scanner. For the card to be accepted upon its scan, the information read from the two-dimensional code of the card may match information expected from a scan of the card and the gesture may match a gesture expected from the scan of the card. The information expected and the gesture expected may be stored in the scanner for comparison with information and gesture scanned from a two dimensional code of a card for a purpose of validating the card and/or a holder of the card.

An access system may incorporate a card scanner and a card having a two-dimensional code imprinted on the card. The card may have an encrypted gesture for scanning by a scanner. The two-dimensional code and encrypted gesture may have to be recognized in the scanner as a predetermined match to recognize a holder to be in legitimate possession of the card.

A gesture may incorporate a change of orientation of the card while the card moves across the scanner.

The orientation may be a rotation of the card during a movement of the card across the scanner. The gesture may further incorporate a direction of the card during the movement of the card across the scanner.

The two-dimensional code may incorporate information about a card holder and what the gesture must be for acceptance of the card to grant an access to or egress from a facility or area.

A number of attempts to scan the card and obtain acceptance of the card may be limited to X. X may be a predetermined number.

The gesture may indicate to the scanner of the card whether the holder of the card is authorized to hold the card according to information deciphered from the two-dimensional code.

A gesture may incorporate a beginning orientation of the card upon a scan, an orientation of the card during the scan, and an ending orientation of the card upon a termination of the scan.

The two-dimensional code may be selected from a group incorporating HanXin codes, quick response (QR) codes and Aztec codes.

U.S. Pat. No. 7,363,200, issued Apr. 22, 2008, is hereby incorporated by reference. U.S. Pat. No. 9,038,897, issued May 26, 2015, is hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An access control mechanism comprising:
    an item having a multidimensional pattern, the multidimensional pattern including rotation and/or direction information; and an optical scanner that decodes the multidimensional pattern and recognizes rotation and direction of the item being moved across the scanner; and wherein:

an entry or exit of a facility or an area is sought for a holder of the item;

the optical scanner upon a scan of the item decodes the multidimensional pattern on the item which has a movement applied to the item by the holder of the item in view of the optical scanner such that the item itself is moved relative to the optical scanner, into a result, wherein the optical scanner performs a comparison of the rotation and/or direction information contained in the multidimensional pattern with the movement applied to the item by the holder, and the comparison is added to the result; and if the result from the scanner regarding the decoded multidimensional pattern and the movement applied to the item meets predetermined criteria, then the entry or exit of the facility or area is granted to the holder of the item.

2. The mechanism of claim 1, the movement is applied to the item before, during or after the scan.

3. The mechanism of claim 2, wherein the movement is one or more actions selected from a group comprising a track of clockwise rotation, a track of counterclockwise rotation, a direction of the item at a beginning of the scan, a direction of the item during the scan, and a direction of the item at an ending of the scan.

4. The mechanism of claim 3, where the item is a card or a badge.

5. The mechanism of claim 4, wherein the multidimensional pattern is a two-dimensional pattern.

6. The mechanism of claim 4, wherein the result contains information or data about the holder of the item.

7. The mechanism of claim 4, wherein the result incorporates information about the movement of the item and the result is reviewed by the scanner to determine whether the movement of the item matches an expected movement of the item; and wherein the movement of the item matching the expected movement of the item is an access condition.

8. The mechanism of claim 7, wherein:

a number of attempted determinations to have the access condition for the movement be met during a scan is limited to Y; and Y is a predetermined number.

9. A method for controlling access, comprising:

writing information on a card in a two-dimensional code, the information including information about a card holder and a description of a movement needed for achieving access, the movement including moving the card in at least one rotation and/or direction;

scanning the card while performing a gesture with the card to read the information from the two-dimensional code on the card; and comparing the gesture with the rotation and/or direction information contained in the two-dimensional code on the card;

wherein when the gesture matches the movement needed for achieving access, access is granted.

10. The method of claim 9, wherein the gesture comprises one or more items selected from a group comprising a direction of the card at a beginning portion of a scan, a direction of the card during the scan, a direction of the card at an ending portion of the scan, a scanning track of clockwise rotation, and a scanning track of counter-clockwise rotation.

11. The method of claim 9, wherein the two-dimensional code may be selected from a group comprising HanXin codes, quick response (QR) codes and Aztec codes.

12. The method of claim 10, wherein:

if the card is accepted upon its scan by a scanner, then the card holder gains access to an entity controlled by the scanner;

for the card to be accepted upon its scan, the information read from the two-dimensional code of the card matches information expected from a scan of the card and the gesture matches the movement needed for achieving access; and the information expected and the movement needed for achieving access are stored in the scanner for comparison with information and gesture scanned from a two dimensional code of a card for a purpose of validating the card and a holder of the card.

13. An access system comprising:

a card scanner; and a card having a two-dimensional code imprinted on the card; and wherein:

the card has an encrypted description of a gesture defining a predetermined movement of the card for scanning by a scanner, the predetermined movement including at least one rotational and/or directional movement of the card over the scanner; and the two-dimensional code and the predetermined movement of the card over the scanner need to be recognized in the scanner as a predetermined match to code information and rotational and/or directional movement information contained in the scanner, in order to recognize a holder to be in legitimate possession of the card.

14. The system of claim 13, wherein a gesture comprises a change of orientation of the card while the card moves across the scanner.

15. The system of claim 14, wherein:

the orientation is a rotation of the card during a movement of the card across the scanner; and the gesture further incorporates a direction of the card during the movement of the card across the scanner.

16. The system of claim 13, wherein the two-dimensional code comprises information about a card holder and what the gesture must be for acceptance of the card to grant an access to or egress from a facility or area.

17. The system of claim 13, wherein:

a number of attempts to scan the card and obtain acceptance of the card is limited to X; and X is a predetermined number.

18. The system of claim 13, wherein the gesture indicates to the scanner of the card whether the holder of the card is authorized to hold the card according to information deciphered from the two-dimensional code.

19. The system of claim 13, wherein the gesture comprises a beginning orientation of the card upon a scan, an orientation of the card during the scan, and an ending orientation of the card upon a termination of the scan.

20. The system of claim 13, wherein the two-dimensional code is selected from a group comprising HanXin codes, quick response (QR) codes and Aztec codes.

* * * * *